No. 758,222. PATENTED APR. 26, 1904.
G. C. STONE.
APPARATUS FOR THE FILTRATION OF GASES.
APPLICATION FILED OCT. 17, 1902.
NO MODEL.
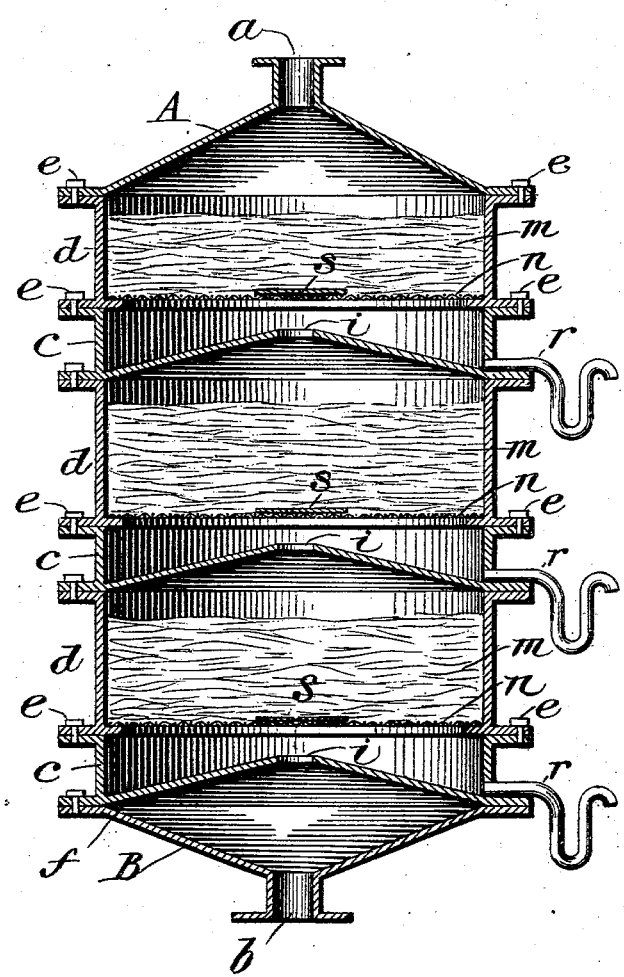

No. 758,222.

Patented April 26, 1904.

UNITED STATES PATENT OFFICE.

GEORGE CAMERON STONE, OF NEW YORK, N. Y., ASSIGNOR TO NEW JERSEY ZINC COMPANY, OF NEW YORK, N. Y., A CORPORATION OF NEW JERSEY.

APPARATUS FOR THE FILTRATION OF GASES.

SPECIFICATION forming part of Letters Patent No. 758,222, dated April 26, 1904.

Application filed October 17, 1902. Serial No. 127,707. (No model.)

*To all whom it may concern:*

Be it known that I, GEORGE CAMERON STONE, a citizen of the United States, residing at New York, county of New York, State of New York, have invented certain new and useful Improvements in Apparatus for the Filtration of Gases; and I do hereby declare the following to be a full, clear, and exact description of the invention, such as will enable others skilled in the art to which it appertains to make and use the same.

My invention relates to apparatus particularly adapted for the filtration of gases by depriving them of the constituents recoverable in such a filter by condensation and precipitation or mechanical entanglement in or upon the filtering material. The apparatus is distinguished by the fact that the body of the filtering material is divided up into a plurality of relatively thin layers, each located within a separate subdivision of the main receptacle, each of said subdivisions or compartments having its individual liquid-discharge and the several subdivisions being independently removable, so that their relative positions may be shifted, if desired, as hereinafter more fully set forth.

In the accompanying drawing I have shown a central vertical section of a preferred form of apparatus embodying my invention.

Referring to the drawings, A indicates the upper or hood portion of the apparatus, provided with the gas-inlet opening $a$, and B indicates a similar section at the bottom of the apparatus, provided with the gas-discharge apertures $b$. Intermediate of the sections A and B are the separate subdivisions or compartments hereinbefore referred to, which in the present instance are three in number, though it will be understood that, if desired, their number may be increased to the extent necessary for any particular use. Each of the said subdivisions or compartments consists of a flanged chamber $c$ and a superjacent flanged chamber $d$. These chambers $c$ and $d$ are adapted to be interposed between the two sections A B and may conveniently be held in place therein by means of the removable pins $e$, so that, for instance, the lower compartment may be removed at any suitable stage of the operation, the two upper compartments lowered, and a new or substitute compartment inserted in the place of the uppermost one of the series.

Each section $c$ is provided with a conical diaphragm $f$, having a central aperture $i$ for the passage of the gases. Each section $d$ is provided at its bottom with an inner flange, upon which rests a screen $n$, which supports the body of fibrous or other suitable filter material $m$, and, as shown, a plate $s$ is placed upon the screen above the corresponding opening $i$, so as to deflect the gas and also to prevent the liquid condensate from one compartment passing into the compartment below. Each subdivision of the apparatus is provided, as shown, with its individual trap-discharge $r$.

The operation of the invention will be apparent. The furnace-gases to be treated enter the apparatus through the inlet-opening $a$ and pass down successively through the relatively thin layers of material $m$ and finally issue at the exit-opening $b$. On their passing downward the gases are deflected by the plates $s$ and, entering the spaces beneath the respective screens, commingle therein before passing onward through the openings $i$. The structure is therefore adapted to more uniformly filter the body of gas passing through it than would be the case if these diaphragms and deflecting-plates were absent. The condensible constituents present in the gases run down the inclined sides of the diaphragms and are separately collected from each compartment without passing onward to its neighbor in the series. This I find to be particularly desirable, for the reason that the material upon the screens, subdivided as it is into relatively small layers, is kept at a high degree of efficiency by the immediate carrying off from each layer of the condensates that would otherwise pass on to the layer beneath it.

While in many instances I prefer to make the parts $c$ and $d$ of each compartment separate, as illustrated in the drawings, yet in other instances they may constitute a single integral structure.

Having thus described my invention, what I claim is—

1. In apparatus of the kind described, a receptacle having a gas-inlet and a gas-outlet, said receptacle being subdivided into a series of communicating compartments or subdivisions, each of said compartments comprising a diaphragm, a screen above said diaphragm and loose material upon the several screens, the space between each diaphragm and screen constituting a liquid-reservoir, said space being provided with an outlet-pipe for said liquid, substantially as described.

2. In apparatus of the kind described, a receptacle having a gas-inlet and a gas-outlet, said receptacle being subdivided into a series of compartments or subdivisions, each of said compartments comprising a conical diaphragm having a central opening, a screen above said diaphragm and loose material upon the several screens, the space between each diaphragm and screen constituting a liquid-reservoir, said space being provided with an outlet-pipe, substantially as described.

3. In apparatus of the kind described, a receptacle having a gas-inlet and a gas-outlet, said receptacle being subdivided into a series of compartments or subdivisions, each of said compartments comprising a conical diaphragm having a central opening, a screen above said diaphragm, a deflecting-plate upon said screen immediately above the aperture in the diaphragm and loose material upon the several screens, the space between each diaphragm and screen constituting a liquid-reservoir, said space being provided with an outlet-pipe, substantially as described.

4. In apparatus of the kind described, a receptacle having a gas-inlet and a gas-outlet, and a series of intermediate subdivisions or compartments, each compartment consisting of a flanged lower section having a perforated diaphragm and a liquid-tap and a flanged upper section having a screen and loose material resting upon the screen, substantially as described.

In testimony whereof I affix my signature in presence of two witnesses.

GEORGE CAMERON STONE.

Witnesses:
HENRY STEELE WARDNER,
WM. P. SETPHEN.